United States Patent
Perry et al.

(10) Patent No.: US 6,591,176 B1
(45) Date of Patent: Jul. 8, 2003

(54) BACKUP POWER SUPPLY FOR A CRASH NOTIFICATION SYSTEM FOR AN AUTOMOTIVE VEHICLE AND METHOD OF OPERATING THE SAME

(75) Inventors: Frank Perry, Brownstown, MI (US); Gurpreet Aulakh, Brownstown, MI (US); James W. Helmke, Highland, MI (US); Mark A. Cuddihy, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,024

(22) Filed: Sep. 11, 2002

(51) Int. Cl.[7] ............................................. G06F 17/00
(52) U.S. Cl. ..................... 701/45; 280/802; 280/735; 307/10.1; 180/271
(58) Field of Search ..................... 701/45; 280/802, 280/734, 735; 307/9.1, 10.1, 10.7; 180/271; 340/438

(56) References Cited

U.S. PATENT DOCUMENTS

| 4,252,342 A | * | 2/1981 | Terabayashi et al. | ....... 280/803 |
|---|---|---|---|---|
| 4,781,267 A | * | 11/1988 | Waineo et al. | ............... 180/268 |
| 5,191,500 A | | 3/1993 | Hatano et al. | |
| 5,432,385 A | * | 7/1995 | Kincaid et al. | ............ 307/10.1 |
| 5,487,956 A | | 1/1996 | Bromley et al. | |
| 5,720,519 A | * | 2/1998 | Barnes | ........................ 280/737 |
| 5,825,098 A | * | 10/1998 | Darby et al. | ................ 307/10.1 |
| 5,936,313 A | * | 8/1999 | Cook et al. | ................. 307/10.1 |
| 5,995,891 A | * | 11/1999 | Mayumi et al. | ............... 701/45 |
| 6,158,768 A | * | 12/2000 | Steffens et al. | ............. 280/735 |

FOREIGN PATENT DOCUMENTS

DE      19644858 A1   *   5/1997            B60R/21/32

* cited by examiner

*Primary Examiner*—William A. Cuchlinski, Jr.
*Assistant Examiner*—Olga Hernandez

(57) ABSTRACT

A crash notification system (12) has a main battery (58) and a backup battery (60). The main battery has a main battery voltage and the backup battery has a backup battery voltage. A telematics control unit (16) senses the voltage of the main battery and receives an emergency notification signal from a restraints control module (18). In response to a change of state of the emergency notification signal and the main battery dropping below a predetermined battery the backup battery may be used. In addition, if an SOS button (52) is employed in the system, and the main battery voltage drops below a predetermined voltage the backup battery (60) may also be used.

10 Claims, 3 Drawing Sheets

BACKUP POWER SUPPLY FOR A CRASH NOTIFICATION SYSTEM FOR AN AUTOMOTIVE VEHICLE AND METHOD OF OPERATING THE SAME

BACKGROUND OF INVENTION

1. Technical Field

The present invention relates generally to crash sensing systems for automotive vehicles, and more particularly, to a backup power supply for a crash notification system and to a method of operating the same.

2. Background

Accident sensing systems typically use accelerometers to determine which safety devices to deploy. For example, a front accelerometer determines the deceleration of the vehicle. The restraints module deploys the front airbag in response to the deceleration being severe or above a predetermined amount. The deceleration corresponds to a crash impact on the front of the vehicle. Side airbag sensors operate in a similar manner in that a laterally mounted acceleration sensor measures the side deceleration on the vehicle due to a crash.

Telematics systems are currently offered by various automakers. Such systems typically contact a response center in response to the deployment of the airbags. The response center then notifies the police that some type of accident has occurred. Such a system, however, does not provide an indication to the severity of the crash.

Some telematics systems incorporate a backup battery to power the system in the event that the main battery or the vehicle wiring is damaged. During maintenance of the vehicle, however, the backup battery may be activated causing unnecessary drain on the battery. This is important especially when an extended life one-time use battery is used in the system. Such batteries are desirable to be used in such applications.

Therefore, it would be desirable to provide a crash notification system that provides a circuit to prevent unnecessary usage of the backup battery.

SUMMARY OF INVENTION

The present invention provides a crash notification system that uses a backup battery when a number of conditions are met to prevent the unnecessary use of the backup battery.

In one aspect of the invention, a crash notification system interfacing coupled to a communication network includes a main battery having a main battery voltage, a backup battery having a backup battery voltage, a restraint control module generating an emergency notification signal, and a telematics control unit coupled to the main battery, the backup battery and the restraint control module. The telematics control unit operates from the backup battery in response to the main battery voltage and the emergency notification signal.

In a further aspect of the invention, a method of operating a crash notification system having a main battery, a backup battery, a restraint control module, and a telematics control unit comprises sensing a main battery voltage, generating an emergency notification signal at the restraint control module and having a first state indicative of an undeployed restraint device and a second state indicative of an event threshold such as that of a deployed restraint device, when an emergency notification signal is in a second state and the main battery voltage is below a predetermined level, operating the telematics with the backup battery.

One advantage of the invention is that unnecessary use of the backup battery is prevented. This allows the design of the backup battery system to be less costly.

Other advantages and features of the present invention will become apparent when viewed in light of the detailed description of the preferred embodiment when taken in conjunction with the attached drawings and appended claims.

DETAILED DESCRIPTION

The following description is generated by way of example. Those skilled in the art will recognize various alternative embodiments and permutations of the present invention.

Figure 1:
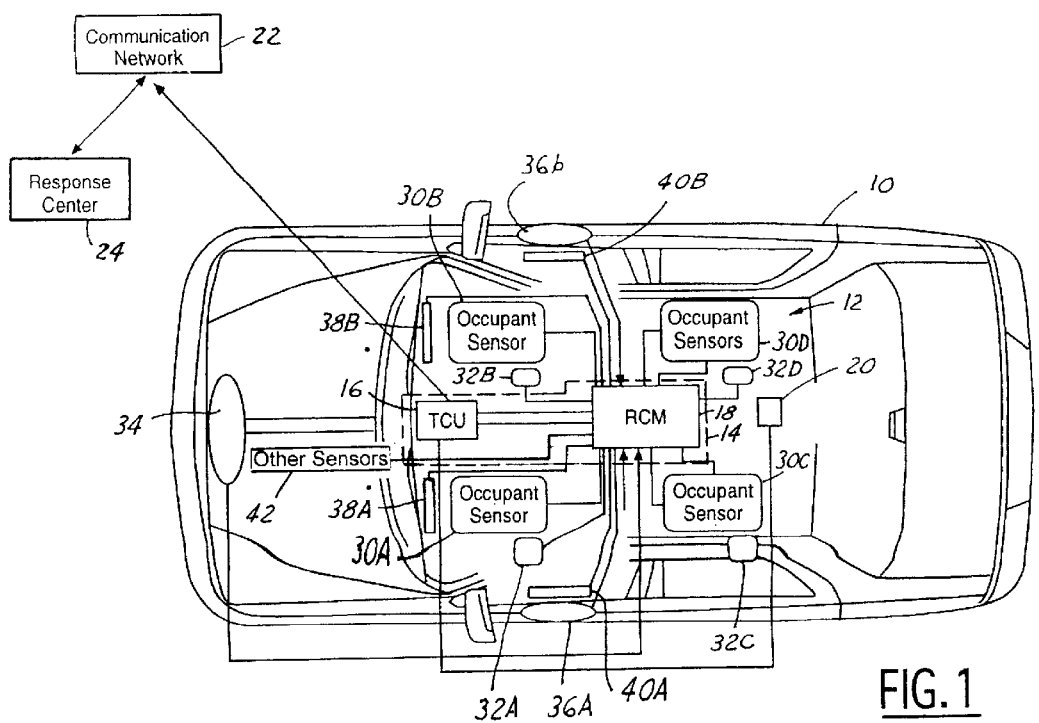
FIG. 1 is a block diagrammatic view of a crash notification system according to the present invention.

Referring now to FIG. 1, an automotive vehicle 10 is illustrated having a crash notification system 12 according to the present invention. Crash notification system 12 has a controller 14. Controller 14 is preferably microprocessor-based and has a memory, I/O ports, and a CPU. Controller 14 may be a central controller within the vehicle or may be a plurality of separate controllers that communicate. For example, controller 14 may have a telematics control unit (TCU) 16 and a restraints control module (RCM) 18. More modules may be used such as a separate module for the rear seat sensors.

Telematics control unit 16 is coupled to a global positioning system (GPS) antenna 20. GPS antenna 20 receives signals from location satellites so that telematics control unit 16 can determine the position of the vehicle 10. Telematics control unit 16 also generates communication signals to a communication network 22.

Communication network 22 may, for example, be a cellular phone network or a satellite communication network. Communication network 22 generates communication signals to a response center 24. Response center 24 may then dispatch appropriate emergency personnel or other assistance as will be further described below. Communications may also be provided to the vehicle occupants from response center 24 through communication network 22. Thus, a two-way communication may be had.

Restraints control module 18 is coupled to occupant sensors 30A, 30B, 30C, and 30D (collectively referred to as occupant sensors 30). Occupant sensors 30 may be one of a variety of types of occupant sensors including a weight-based sensor, an infrared, ultrasonic, or other types of sensors that sense the presence of a person within a seating position of the vehicle. Preferably, an occupant sensor is provided for each seating position. Occupant sensor 30A is positioned at the driver's seat. Occupant sensor 30B is positioned at the passenger front seat. Occupant sensors 30C and 30D are illustrated in the rear position. Although only two rear occupant sensors 30C and 30D are illustrated, various numbers of rear occupant sensors may be employed depending on the type of vehicle. For example, three occupant sensors may be provided across the rear seat. Also, several rows of seating positions and thus several rows of occupant sensors may be provided in the seats of full-size vans, mini-vans, sport utility vehicles, and station wagons.

The occupant sensors generate an occupant sensor status signal that corresponds to the presence of an occupant in the various seating positions.

Restraints control module 18 may also be coupled to a plurality of seat belt switches 32A, 32B, 32C, and 32D (collectively referred to as seat belt switch 32.) Seat belt switches 32 generate a seat belt status signal corresponding to the buckle or unbuckled state of the seat belts in the various positions. Preferably, each of the seating positions has a seat belt switch. As illustrated, seat belt switch 32A corresponds to the driver seat belt switch. Seat belt switch 32B corresponds to the front passenger seat, seat belt switches 32C and 32D correspond to the rear seat belt switches.

Restraints control module 18 is also coupled to a front crash sensor 34 and side crash sensors 36A and 36B. Both front crash sensor and side crash sensors 36A and 36B are preferably accelerometer-based. The crash sensors thus generate a crash signal corresponding to a crash in the particular part of the vehicle in which the sensors are located. In response to a severe crash signal, front airbags 38A and/or 38B may be deployed. Likewise, when a severe side crash signal is generated from side sensors 36A and/or 36B, side airbags 40A and/or 40B may be deployed.

Based on this information the controller 14 may generate an emergency communication signal to communication network 22 in response to the occupant sensor status signal, and the crash status signal. This may for example be done through telematics control unit 16. As well, the seat belt status signal may also be used to form the communication signal. In response to the communication signal, the response center 24 may be used to deploy the appropriate emergency level response.

Thus, the emergency notification signal has a first state that indicates that none of the restraints has been deployed and a second state indicating that at least one of the restraints has been deployed.

Other sensors 42 may also be used by controller 14. For example, other sensors 42 may include the speed of impact, various accelerations, and the like. The direction of impact may also be determined but may be based on the input from crash sensors 34, 36A, and 36B.

Figure 2:
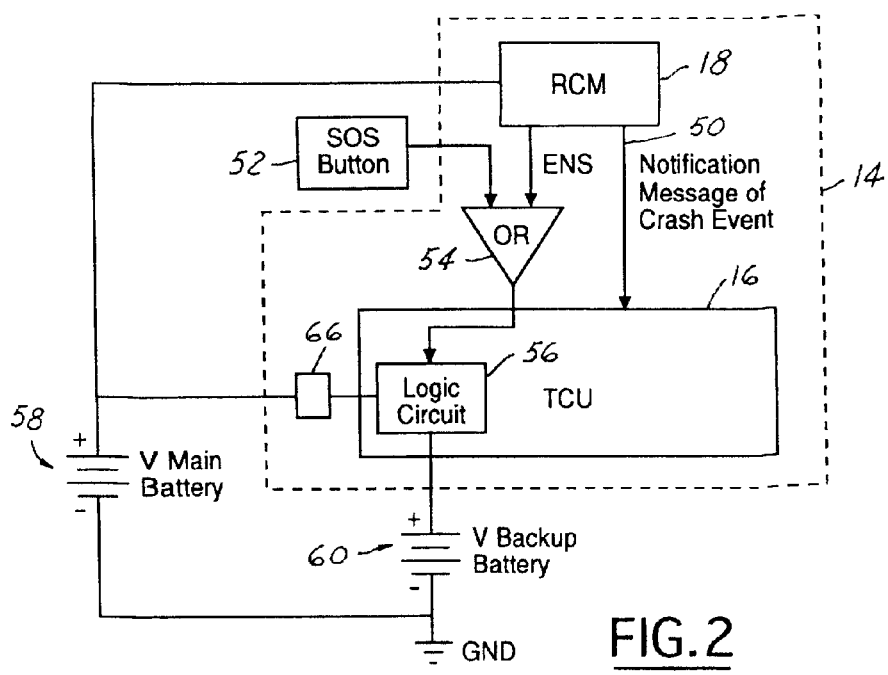
FIG. 2 is more detailed schematic illustrating.

Referring now to FIG. 2, controller 14 is illustrated in further detail with restraint control module 18 and telematics control unit 16. An output 50 in restraints control module 18 provides a notification message of a crash event to telematics control unit 16. An SOS button 52 may also be provided in the vehicle. SOS button 52 provides an indication that something is wrong within the vehicle without a crash event. This is a manually operated button for the vehicle operator to depress. The SOS button 52 is coupled to an OR gate 54. In addition, the restraint control module 18 is also coupled to OR gate 54. The restraint control module generates the emergency notification signal through output 53 which is electrically coupled to OR gate 54.

Telematics control unit 16 has a logic circuit 56 therein. Logic circuit 56 is coupled to main battery 58 and a backup battery 60. Each battery 58 and 60 is coupled to a common ground 62. Logic circuit 56 controls the operation of telematics control unit using either battery 58 or backup battery 60 as will be further described below. Logic circuit 56 may be part of the controller of the telematics control unit 16 or a separate piece of logic. Logic control circuit 56 thus receives the signal from OR gate 54 to determine whether the main battery 58 or the backup battery 60 should be used. Of course, those skilled in the art will recognize that logic circuit 56 may incorporate the OR gate 54 therein. Logic circuit 56 may include an integral voltage sensing circuit or a separate voltage sensor 66.

Figure 3:
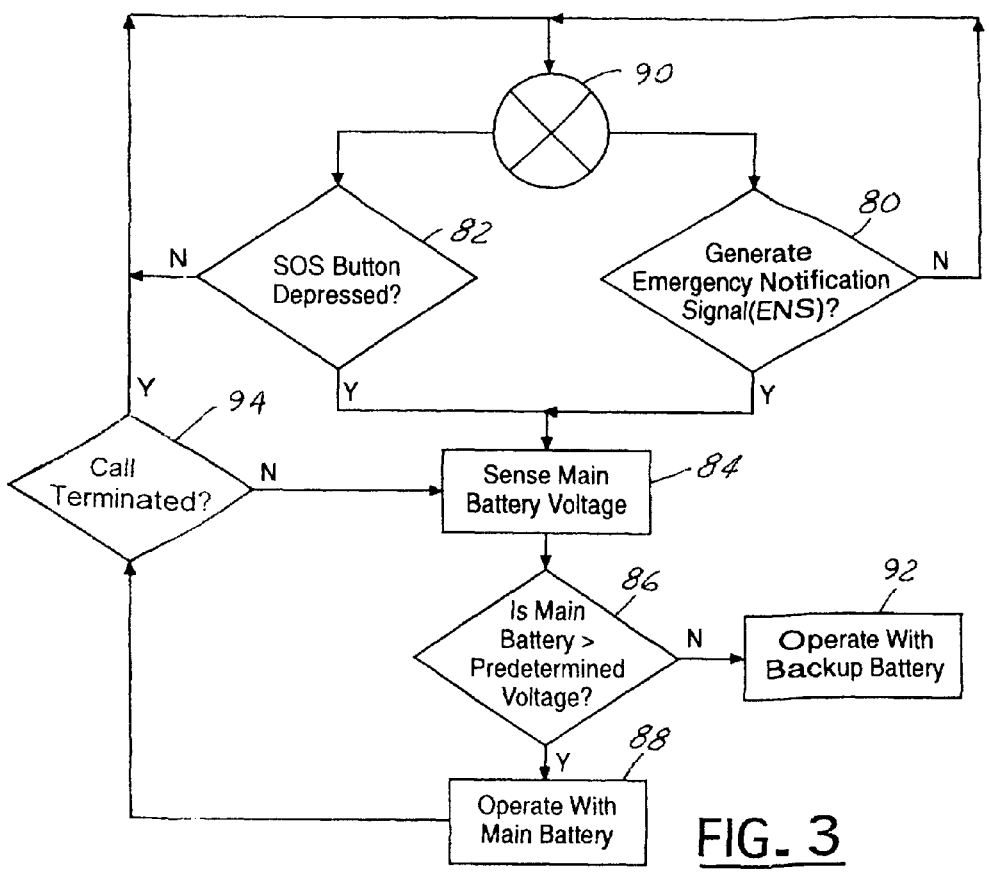
FIG. 3 is a method for operating the crash notification system of the present invention.

Referring now to FIG. 3, the operation of the crash notification system is described. It should be noted that the order of the steps in the system may be changed. In step 80 if the emergency notification signal 80 is generated, or in step 82 if the SOS button is depressed, step 84 is performed. The emergency notification signal may be generated by the restraint control module as described above. A change of state may be used to determine whether a restraint has been deployed. In step 84 the main battery voltage is sensed. In step 86 if the main battery voltage is greater than a predetermined voltage then step 88 is executed. In step 88 the system is operated with the main battery while not operating at all with the backup battery. After step 88 step 94 is executed. If the triggering event has not terminated step 84 is repeated. When the main voltage drops below the predetermined voltage in step 86, step 92 is executed. In step 82 it is determined whether or not the SOS button has been depressed. If the SOS button has not been depressed then step 90 is performed. In step 80 if the emergency notification signal has not changed state, step 90 is executed. In step 88 the system is then operated with the main battery. The system then checks to see if the triggering event has terminated in step 94. If the telematics unit 16 has not terminated the call, steps 84, 86, 88 and 94 are continuously repeated. Otherwise the system is reset to step 90.

Referring back to step 80, if the emergency notification signal has changed state then step 84 is executed. In step 92 the system is operated with the backup battery.

Referring back to step 82, if the SOS button has been depressed and the main voltage is lower than a predetermined voltage then step 92 is also executed in which the system is operated with the backup battery.

Thus, if there is a loss of the main battery due to crash or a problem with the main battery the system will be operated with the backup battery. If the main battery is disconnected such as during servicing, operation with the backup battery will not be triggered unless the SOS button has been depressed.

While particular embodiments of the invention have been shown and described, numerous variations and alternate embodiments will occur to those skilled in the art. Accordingly, it is intended that the invention be limited only in terms of the appended claims.

What is claimed is:

1. A method of operating a crash notification system having a main battery, a backup battery and a telematics control unit comprising:

sensing a main battery voltage;

generating an emergency notification signal having a first state indicative of an undeployed restraint device and a second state indicative of a deployed restraint device;

when an emergency notification signal is in a second state and the main battery voltage is below a predetermined level, operating the telematics with the backup battery.

2. A method as recited in claim 1 further comprising when a help button is depressed and the main battery voltage is below a predetermined level, operating the telematics with the backup battery.

3. A method as recited in claim 1 further comprising when an emergency notification signal is in a first state and the main battery voltage is below a predetermined level, not operating the telematics with the backup battery.

4. A method as recited in claim 3 further comprising when a help button is depressed and the main battery voltage is below a predetermined level, operating the telematics with the backup battery.

5. A method of operating a crash notification system having a main battery, a backup battery and a telematics control unit comprising:

sensing a main battery voltage;

generating an emergency notification signal having a first state indicative of an undeployed restraint device and a second state indicative of a deployed restraint device;

when an emergency notification signal is in a second state and the main battery voltage is below a predetermined level, operating the telematics with the backup battery, when a help button is depressed and the main battery voltage is below a predetermined level, operating the telematics with the backup battery, when an emergency notification signal is in a first state and the main battery voltage is below a predetermined level, not operating the telematics with the backup battery.

6. A crash notification system interfacing coupled to a communication network comprising:

a main battery having a main battery voltage;

a backup battery having a backup battery voltage;

a restraint control module generating an emergency notification signal; and a controller coupled to the main battery, the backup battery and the restraint control module, said controller operating from the backup battery in response to said main battery voltage and said emergency notification signal.

7. A crash notification system as recited in claim 6 further comprising a help button coupled to the controller, when a help button is depressed and the main battery voltage is below a predetermined level, said controller operated by the backup battery.

8. A crash notification system as recited in claim 6 wherein said help button is coupled to the controller through an OR gate.

9. A crash notification system as recited in claim 6 wherein when an emergency notification signal is in a first state and the main battery voltage is below a predetermined level, said controller not operating the telematics with the backup battery.

10. A crash notification system as recited in claim 6 wherein said controller comprises a telematics control unit.

* * * * *